United States Patent [19]

Tachikawa

[11] Patent Number: 5,559,376
[45] Date of Patent: Sep. 24, 1996

[54] POWER SUPPLY CONTROL SYSTEM COMPRISING A PLURALITY OF POWER SUPPLY UNITS

[75] Inventor: Hiroshi Tachikawa, Koufu, Japan

[73] Assignee: NEC Corporation, Tokyo, Japan

[21] Appl. No.: 10,805

[22] Filed: Jan. 29, 1993

[30] Foreign Application Priority Data

Jan. 29, 1992 [JP] Japan .................................. 4-038623

[51] Int. Cl.$^6$ ...................................................... H02J 1/00
[52] U.S. Cl. .............................. 307/86; 307/18; 307/41; 307/43
[58] Field of Search ................................... 307/29, 38, 39, 307/40, 41, 85, 86, 43, 18, 19; 361/62, –66, 166, 167; 364/492, 493

[56] References Cited

U.S. PATENT DOCUMENTS

| | | | |
|---|---|---|---|
| 4,663,539 | 5/1987 | Sharp et al. | 307/38 |
| 4,674,031 | 6/1987 | Siska, Jr. | 307/38 |
| 4,747,041 | 5/1988 | Engel et al. | 307/39 |

*Primary Examiner*—William M. Shoop, Jr.
*Assistant Examiner*—Jonathan S. Kaplan
*Attorney, Agent, or Firm*—Foley & Lardner

[57] ABSTRACT

In a power supply control system including first through N-th power supply units for generating first through N-th output voltages, the first through the N-th power supply units producing first through N-th failure signals on occurrence of failure in the first through the N-th power supply units, respectively. A sequence control unit carries out a power on sequence which is for sequentially putting the first through the N-th power supply units into an on state in voltage increasing order of the output voltages and carries out a power off sequence which is for sequentially putting the first through the N-th power supply units into an off state in voltage decreasing order of the output voltages. A failure detection control unit, in response to one of the first through the N-th failure signals, simultaneously puts a specific unit of the first through the N-th power supply units that produces the one of the first through the N-th failure signals and the power supply units having the output voltages which are not lower than that of the specific unit into the off state and subsequently puts the power supply unit having the output voltages which are lower than that of the specific unit into the off state in accordance with the power off sequence.

6 Claims, 4 Drawing Sheets

POWER SUPPLY CONTROL SYSTEM COMPRISING A PLURALITY OF POWER SUPPLY UNITS

BACKGROUND OF THE INVENTION

This invention relates to a power supply control system comprising a plurality of power supply units and is specifically directed to protect logic circuits connected to the power supply units from failure of over-voltage and under-voltage occurring in the power supply units. Such a power supply control system is particularly useful for a computer system.

Generally, the computer system comprises a power supply control system comprising a plurality of power supply units for generating a plurality of output voltages, such as −4.5 volts, −3 volts, and −2 volts, which are specified by lowest through highest voltages, respectively. The plurality of output voltages are supplied to a variety of units, such as processors, input/output units, and the like, which are implemented by logic circuits. In such a power supply control system, the plurality of power supply units are put into an on state in accordance with a power on sequence and put into an off state in accordance with a power off sequence. As will later be described, the power on sequence is for sequentially putting the plurality of power supply units into the on state in voltage increasing order of the output voltages of the plurality of power units. The power off sequence is for sequentially putting the plurality of power units into the off state in voltage decreasing order of the output voltages.

In the power supply control system, there is a case that one of the plurality of power supply units has failure, such as over-voltage or under-voltage. The power supply unit having the failure is called a failure power supply unit. In such a case, all of the plurality of power supply units should be put into the off state. Especially, it is desirable that the failure power supply unit is immediately put into the off state previous to other power supply units. In the conventional power supply control system, the plurality of power supply units are, however, put into the off state in accordance with the power off sequence described above even if the failure occurring in one of the plurality of power supply units. In this case, if the failure power supply unit is for generating the lowest output voltage, the failure power supply unit is put into the off state last in accordance with the power off sequence. This means that the logic circuits connected to the failure power supply unit are kept in an abnormal condition until the failure power supply unit is put into the off state. Under the condition, the logic circuits connected to the failure power supply unit often suffer damage from the failure power supply unit.

SUMMARY OF THE INVENTION

It is therefore an object of this invention to provide a power supply control system which is capable of reducing a duration of an abnormal condition caused by a failure power supply unit.

It is another object of this invention to provide the power supply control system which is capable of preventing logic circuits from damage caused by the failure power supply unit.

Other objects of this invention will become clear as the description proceeds.

On describing the gist of a first aspect of this invention, it is possible to understand that a method is for controlling first through N-th power supply units so as to put into an on state and to put into an off state by the use of control means, where N represents a natural number greater than two. The first through the N-th power supply units generate first through N-th output voltages which are specified by lowest through highest voltages, respectively, and produce first through N-th failure signals on occurrence of failure in the first through the N-th power supply units, respectively. The control means is connected to indicating means which is for selectively indicating one of a power on sequence and a power off sequence. The power on sequence is for sequentially putting the first through the N-th power supply units into the on state in voltage increasing order of the output voltages. The power off sequence is for sequentially putting the first through the N-th power supply units into the off state in voltage decreasing order of the output voltages.

According to the first aspect of this invention, the method comprises the steps of putting the first through the N-th power supply units into the on state in accordance with the power on sequence when the indicating means indicates the power on sequence, putting the first through the N-th power supply units into the off state in accordance with the power off sequence when the indicating means indicates the power off sequence, simultaneously putting, in response to one of the first through the N-th failure signals, a specific unit of the first through the N-th power supply units that produces the one of the first through the N-th failure signals and the power supply units having the output voltages which are not lower than that of the specific unit into the off state regardless of the power off sequence, and putting, following the simultaneous putting step, the power supply units having the output voltages which are lower than that of the specific unit into the off state in accordance with the power off sequence.

On describing the gist of a second aspect of this invention, it is possible to understand that a power supply control system includes first through N-th power supply units for generating first through N-th output voltages which are specified by lowest through highest voltages, respectively, where N represents a natural number greater than two. The first through the N-th power supply units produce first through N-th failure signals on occurrence of failure in the first through the N-th power supply units, respectively. The power supply control system further includes indicating means for selectively indicating one of a power on sequence and a power off sequence of the first through the N-th power supply units and sequence control means for carrying out the power on sequence when the indicating means indicates the power on sequence and carrying out the power off sequence when the indicating means indicates the power off sequence. The power on sequence is for sequentially putting the first through the N-th power supply units into an on state in voltage increasing order of the output voltages. The power off sequence is for sequentially putting the first through the N-th power supply units into an off state in voltage decreasing order of the output voltages.

According to the second aspect of this invention, the power supply control system further comprises means responsive to one of the first through the N-th failure signals for simultaneously putting a specific unit of the first through the N-th power supply units that produces the one of the first through the N-th failure signals and the power supply units having the output voltages which are not lower than that of the specific unit into the off state regardless of the power off sequence and subsequently putting the power supply units having the output voltages which are lower than that of the specific unit into the off state in accordance with the power off sequence.

DESCRIPTION OF THE PREFERRED EMBODIMENT

Figure 1:
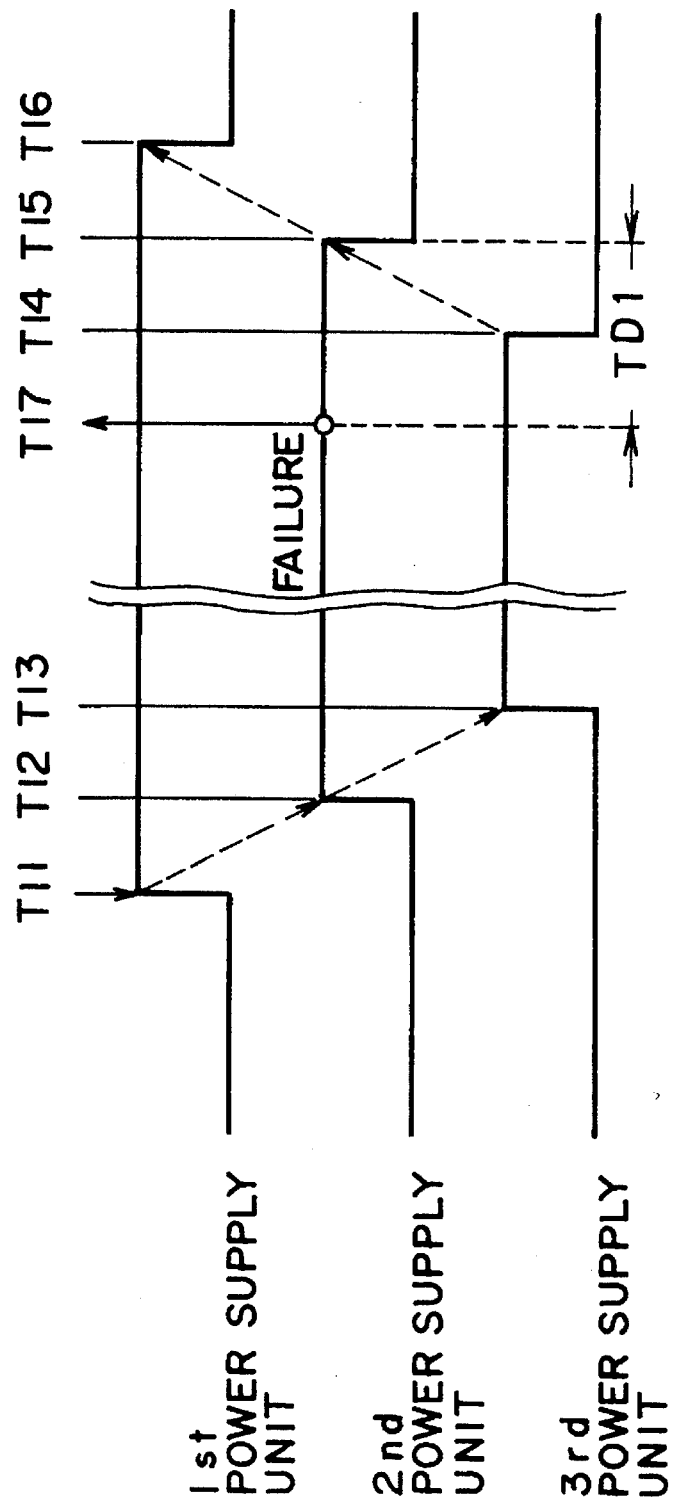
FIG. 1 is a time chart for use in describing conventional power on and power off sequences.

Referring to FIG. 1, a conventional power supply control system will be described at first in order to facilitate an understanding of the present invention. Let the power supply control system comprise first through third power supply units (not shown) generating first through third output voltages. It will be assumed that the first through the third output voltages are equal to −4.5 volts, −3 volts, and −2 volts, respectively. Namely, the first output voltage is a lowest output voltage while the third output voltage is a highest output voltage. The first through the third power supply units produce first through third failure signals on occurrence of failure in the first through the third power supply units, respectively. The power supply control system further comprises a switch (not shown) for selectively indicating one of a power on sequence and a power of sequence. When the switch indicates the power on sequence, the power supply control system indicates the power on sequence, the power supply control system carries out the power on sequence in the manner which will be described hereafter. If the switch indicates the power off sequence, the power supply control system carries out the power off sequence.

In FIG. 1, the power on sequence is for sequentially putting the first through the third power supply units into an on state in voltage increasing order of the first through the third output voltages. When the switch indicates the power on sequence, the first power supply unit is, at first, put into the on state at a first time instant T11 as shown in a lefthand side of a top line of FIG. 1. This is because the first power supply unit is for generating the lowest output voltage. Subsequently, the second power supply unit is put into the on state at a second time instant T12 as shown in the lefthand side of a second line of FIG. 1. At last, the third power supply unit is put into the on state at a third time instant T13 as shown in the lefthand side of a bottom line of FIG. 1.

On the other hand, the power off sequence is for sequentially putting the first through the third power supply units into an off state in voltage decreasing order of the first through the third output voltages. If the switch indicates the power off sequence the third power supply unit is, at first, put into the off state at a fourth time instant T14 as shown in a righthand side of the bottom line of FIG. 1. This is because the third power supply unit is for generating the highest output voltage. Subsequently, the second power supply unit is put into the off state at a fifth time instant T15 as shown in the righthand side of the second line of FIG. 1. At last, the first power supply unit is put into the off state at a sixth time instant T16 as shown in he righthand side of the top line of FIG. 1.

Let the second power supply unit produce a second failure signal at a seventh time instant T17. In this event, the second power supply unit should be immediately put into the off state. However, the first through the third power supply units are sequentially put into the off state in accordance with the power off sequence regardless of the failure. As mentioned before, the second power supply unit is put into the off state at the fifth time instant T15 after the third power supply unit is put into the off state at the fourth time instant T14. This means that logic circuits connected to the second power supply unit are kept in an abnormal condition during a time duration TD1 which lasts from the seventh time instant T17 to the fifth time instant T15. Under this condition, the logic circuits connected to the second power supply unit often suffer damage from the second power supply unit having the failure.

Figure 2:
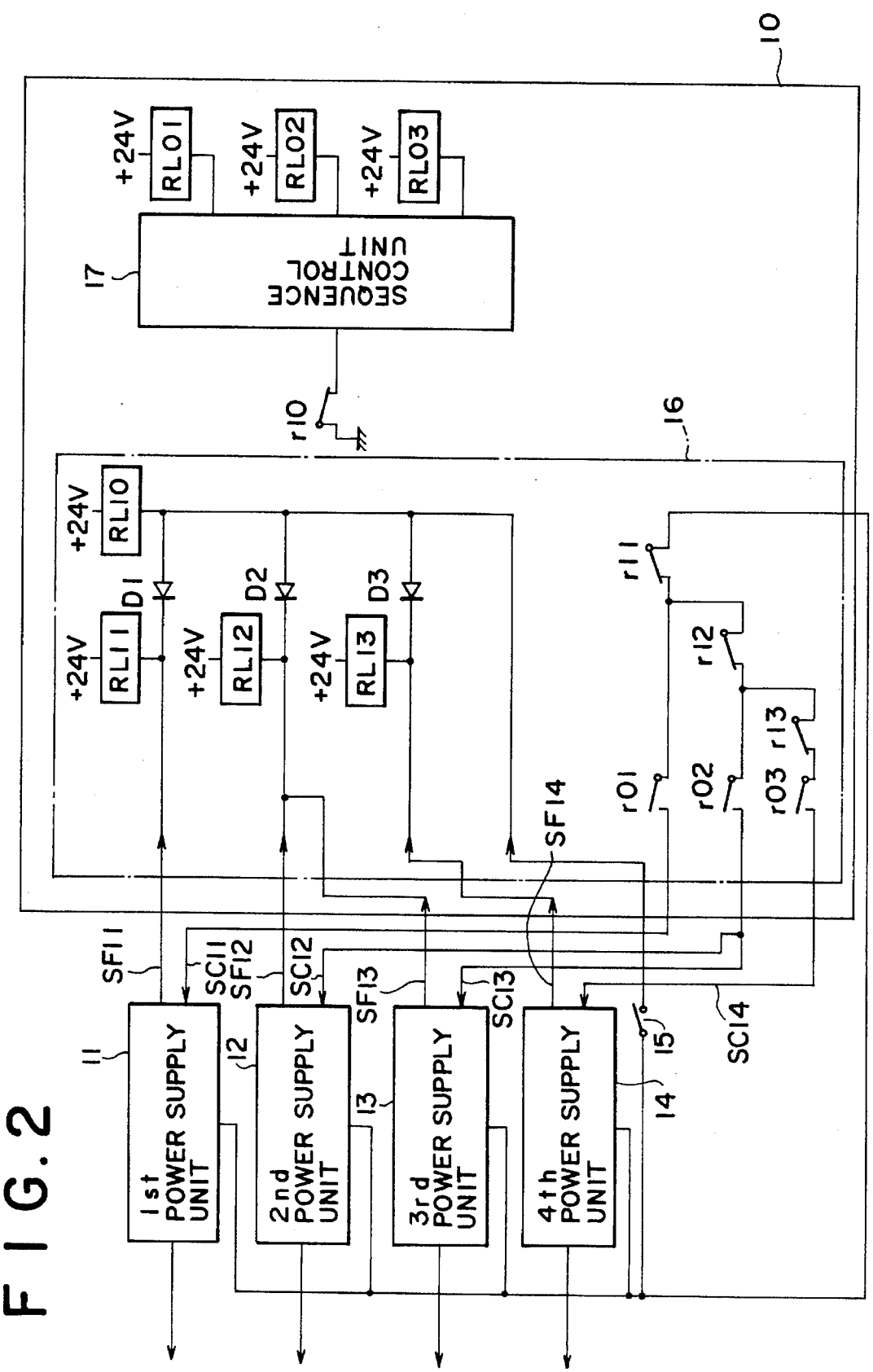
FIG. 2 is a block diagram of a power supply control system according to a preferred embodiment of this invention.

Referring to FIG. 2, the description will proceed to a power supply control system according to a preferred embodiment of this invention. The power supply control system comprises a control unit 10 connected to first through fourth power supply units 11 to 14 and a switch 15. The switch 15 is connected between the control unit 10 and the first through the fourth power supply units 11 to 14. The switch 15 is for selectively indicating one of the power on sequence and the power off sequence which were described before. In the example, when the switch 15 is opened, it indicates the power on sequence. If the switch 15 is closed, it indicates the power off sequence. The switch 15 may be called an indicating unit.

It will be assumed that the first power supply unit 11 generates a first output voltage equal to −4 volts. The second and the third power supply units 12 and 13 generate second and third output voltages which are equal to −3.5 volts. The fourth power supply unit 14 generates a fourth output voltage equal to −2 volts. The first through the fourth output voltages are supplied to a variety of units, such as processors, input/output units, and the like, which are implemented by logic circuits. The first through the fourth power supply units 11 to 14 produce first through fourth failure signals, respectively, on occurrence of failure. The first through the fourth failure signals are supplied to the control unit 10 through first through fourth failure signal lines SF11 to SF14.

The control unit 10 comprises a failure detection control circuit 16 and a sequence control unit 17. As will later be described, the failure detection control circuit 16 is for supplying first through fourth power on signals, through first through fourth control signal lines SC11 to SC14, to the first through the fourth power supply units 11 to 14, respectively, in accordance with the power on sequence. Each of the first through the fourth power on signals is for indicating the one state of each of the first through the fourth power supply units. The failure detection control circuit 16 further supplies first through fourth power off signals, through first through fourth control signal lines SC11 to SC14, to the first through the fourth power supply units 11 to 14, respectively, in accordance with the power off sequence. Each of the first through the fourth power off signals is for indicating the off state of each of the first through the fourth power supply units. Furthermore, the failure detection control circuit 16 supplies the first through the fourth power off signals on reception of one of the first through the fourth failure signals delivered from the first through the fourth power supply units 11 to 14.

The failure detection control circuit 16 comprises a control relay RL10 having a normally-closed contact r10 and is connected between the switch 15 and an additional power supply unit (not shown) generating an additional voltage equal to +24 volts. The control relay RL10 is further connected to the first and the fourth failure signal lines SF11 and SF14 through first and third diodes D1 and D3. The control relay RL10 is still further connected to the second and the third failure signal lines SF12 and SF13 through a second diode D2. This is because the second and the third power supply units 12 and 13 generate the second and the third output voltages which are equal to each other. The first diode D1 is for stopping the first failure signal from flowing into the second through the fourth failure signals lines SF12 to SF14. The second and the third diodes D2 and D3 are similar to the first diode D1.

The failure detection control circuit 16 further comprises a first detection relay RL11 having a first normally-closed contact r11 and connected to the first failure signal line SF11, a second detection relay RL12 having a second normally-closed contact r12 and connected to the second and the third failure signal lines SF12 and SF13, and a third detection relay r13 having a third normally-closed contact r13 and connected to the fourth failure signal line SF4. The first through the third detection relays RL11 to RL13 are connected to the additional power supply unit of +24 volts in common.

The control relay RL10 is energized or activated when the switch 15 is closed. As a result of activation of the control relay RL10, the normally-closed contact r10 is put into a closed state. The first and the third detection relays RL11 and RL13 are activated on reception of th first and the fourth failure signals, respectively. The second detection relay RL12 is activated on reception of one of the second and the third failure signals. As a result of activation of each of the first through the third detection relays RL11 to RL13, each of the first through the third normally-closed contacts r11 to r13 is put into an open state. A circuit including the control relay RL10 and the first and the third detection relays RL11 and RL13 may be called a signal receiving circuit.

The sequence control unit 17 is for carrying out the power on sequence and the power off sequence in accordance with a predetermined sequence program. For this purpose, the sequence control unit 17 comprises a memory unit (not shown) in which the predetermined sequence program is memorized. The predetermined sequence program is determined taking voltage levels of the first through the fourth output voltages into consideration. The sequence control unit 17 is connected to the normally-closed contact r10 which is grounded. First through third sequence relays RL01 to RL03 are connected between the sequence control unit 17 and the additional power supply unit of +24 volts. The first through the third sequence release RL01 to RL03 have first through third normally-open contacts depicted at r01, r02, and r03, respectively. The first normally-closed contact r11 and the first normally-open contact r01 are connected, in serial, to the first power supply unit 11 through the first control signal line SC11. The second normally-closed contact r12 and the second normally-open contact r02 are connected in serial. Furthermore, the second normally-closed contact r12 is connected to a connection point between the first normally-closed contact r11 and the first normally-open contact r01. The second normally-open contact r02 is connected to the second and the third power supply units 12 and 13 through the second and the third control signal lines SC12 and SC13, respectively. The third normally-closed contact r13 and the third normally-open contact r03 are connected in serial. The third normally-closed contact r13 is connected to a connection point between the second normally-closed contact r12 and the second normally-open contact r02. The third normally-open contact r03 is connected to the fourth power supply unit 14 through the fourth control signal line SC14.

According to a contact circuit arrangement illustrated in FIG. 2, the first through the fourth power off signals are sequentially supplied to the first through the fourth power supply units 11 to 14, respectively, as described hereunder. Let all the first through the third normally-open contacts r01 to r03 be present at the closed state. In this case, if the first normally-closed contact r11 is put into the open state, the first through the fourth power off signals are simultaneously supplied to the first through the fourth power supply units 11 to 14, respectively. When the second normally-closed contact r12 is put into the open state, the second through the fourth power off signals are simultaneously supplied to the second through the fourth power supply units 12 to 14, respectively. If the third normally-closed contact r13 is put into the open state, only the fourth power off signal is supplied to the fourth power supply unit 14. The contact circuit arrangement mentioned above may be called a signal supply circuit.

Figure 3:
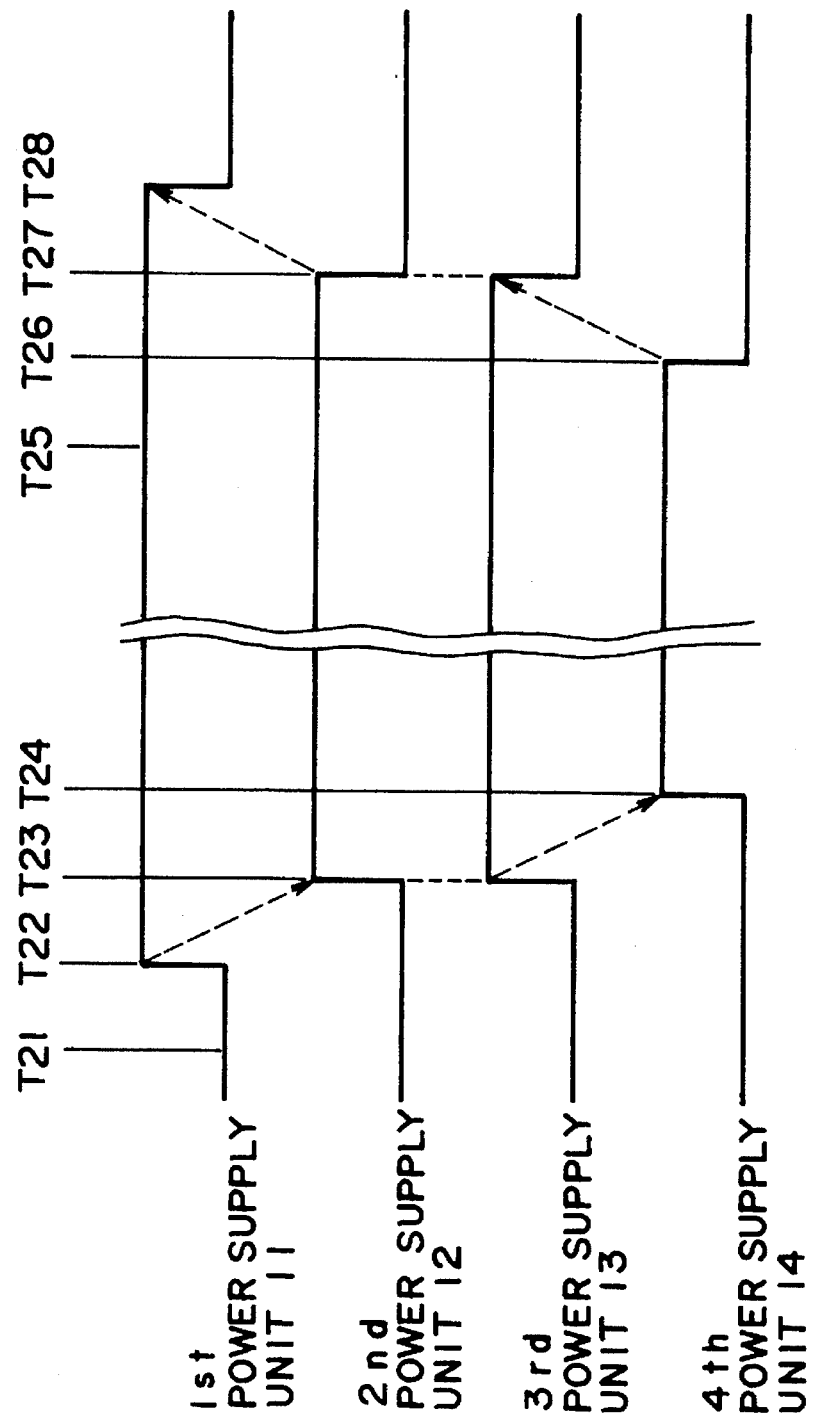
FIG. 3 is a time chart for use in describing power on and power off sequences according to this invention.

Referring to FIG. 3 together with FIG. 2, the description will be made as regards the power on sequence and the power off sequence carried out by the sequence control unit 17. Let the switch 15 be present at a closed state. In this event, the control relay RL10 is present at an active state. The normally-closed contact r10 is therefore present at the closed state. The first through the third normally-closed contacts r11 to r13 are present at the closed state. On the other hand, the first through the third normally-open contacts r01 to r03 are present at the open state. This means that all the first through the fourth power supply units 11 to 14 are present at the off state.

Under the condition, the switch 15 is opened at a first time instant T21, the control relay RL10 is put into an inactive state. As a result, the normally-closed contact r10 is put into the open state. In this event, the sequence control unit 17 carries out the power on sequence. In the power on sequence, the sequence control unit 17 sequentially put the first through the third sequence relays RL01 to RL03 into the active state.

In detail, the first sequence relay RL01 is, at first, put into the active state at a second time instant T22. As a result, the first normally-open contact r01 is put into the closed state. This means that the first power on signal indicating the on state is supplied to the first power supply unit 11 through the first control signal line SC11. On reception of the first power on signal, the first power supply unit 11 is put into the on state as shown in a lefthand side of a top line of FIG. 3. Next, the second sequence relay RL02 is put into the active state at a third time instant T23. As a result, the second normally-open contact r02 is put into the closed state. This means that the second and the third power on signals indicating the on state are simultaneously supplied to the second and the third power supply units 12 and 13 through the second and the third control signal lines SC12 and SC13, respectively. On reception of the second and the third power on signals, the second and the third power supply units 12 and 13 are simultaneously put into the on state as shown in the lefthand side of second and third lines of FIG. 3. This is because the second and the third power supply units 12 and 13 are for generating the second and the third output voltages which are equal to each other. At last, the third sequence relay RL03 is put into the active state at a fourth time instant T24. As a result, the third normally-open contact r03 is put into the closed state. This means that the third power on signal indicating the on state is supplied to the fourth power supply unit 14 through the fourth control signal line SC14. On reception of the fourth power on signal, the fourth power supply unit 14 is put into the on state as shown in the lefthand side of a bottom line of FIG. 3. Thus, the first through the fourth power supply units 11 to 14 are sequentially put into the on state in voltage increasing order of the first through the fourth output voltages. In addition, each of the first through the fourth power on signals indicating the on state is represented by a logic zero value.

Under the condition mentioned above, if the switch 15 is closed at a fifth time instant T25, the control relay RL10 is put into the active state. Accordingly, the normally-closed contact r10 is put into the closed state. In this case, the sequence control unit 17 carries out the power off sequence. In the power off sequence, the sequence control unit 17 sequentially put the first through the third sequence relays RL01 to RL03 into the inactive state.

In detail, th third sequence relay RL03 is, at first, put into the inactive state at a sixth time instant T26. As a result, the third normally-open contact r03 is put into the open state. This means that the third power off signal indicating the off state is supplied to the fourth power supply unit 14 through the fourth control signal line SC14. On reception of the fourth power off signal, the fourth power supply unit 14 is put into the off state as shown in the righthand side of the bottom line in FIG. 3. Next, the second sequence relay RL02 is put into the inactive state at a seventh time instant T27. As a result, the second normally-open contact r02 is put into the open state. This means that the second and the third power off signals indicating the off state are simultaneously supplied to the second and the third power supply units 12 and 13 through the second and the third control signal lines SC12 and SC13, respectively. On reception of the second and the third power off signals, the second and the third power supply units 12 and 13 are simultaneously put into the off state as shown in the righthand side of the second and the third lines of FIG. 3. At last, the first sequence relay RL01 is put into the inactive state at an eighth time instant T28. As a result, the first normally-open contact r01 is put into the open state. This means that the first power off signal indicating the off state is supplied to the first power supply unit 11 through the first control signal line SC11. On reception of the first power off signal, the first power supply unit 11 is put into the off state as shown in the righthand side of the top line of FIG. 3. Thus, the first through the fourth power supply units 11 to 14 are sequentially put into the off state in voltage decreasing order of the first through the fourth output voltages. In addition, each of the first through the fourth power off signals indicating the off state is represented by a logic one value.

Figure 4:
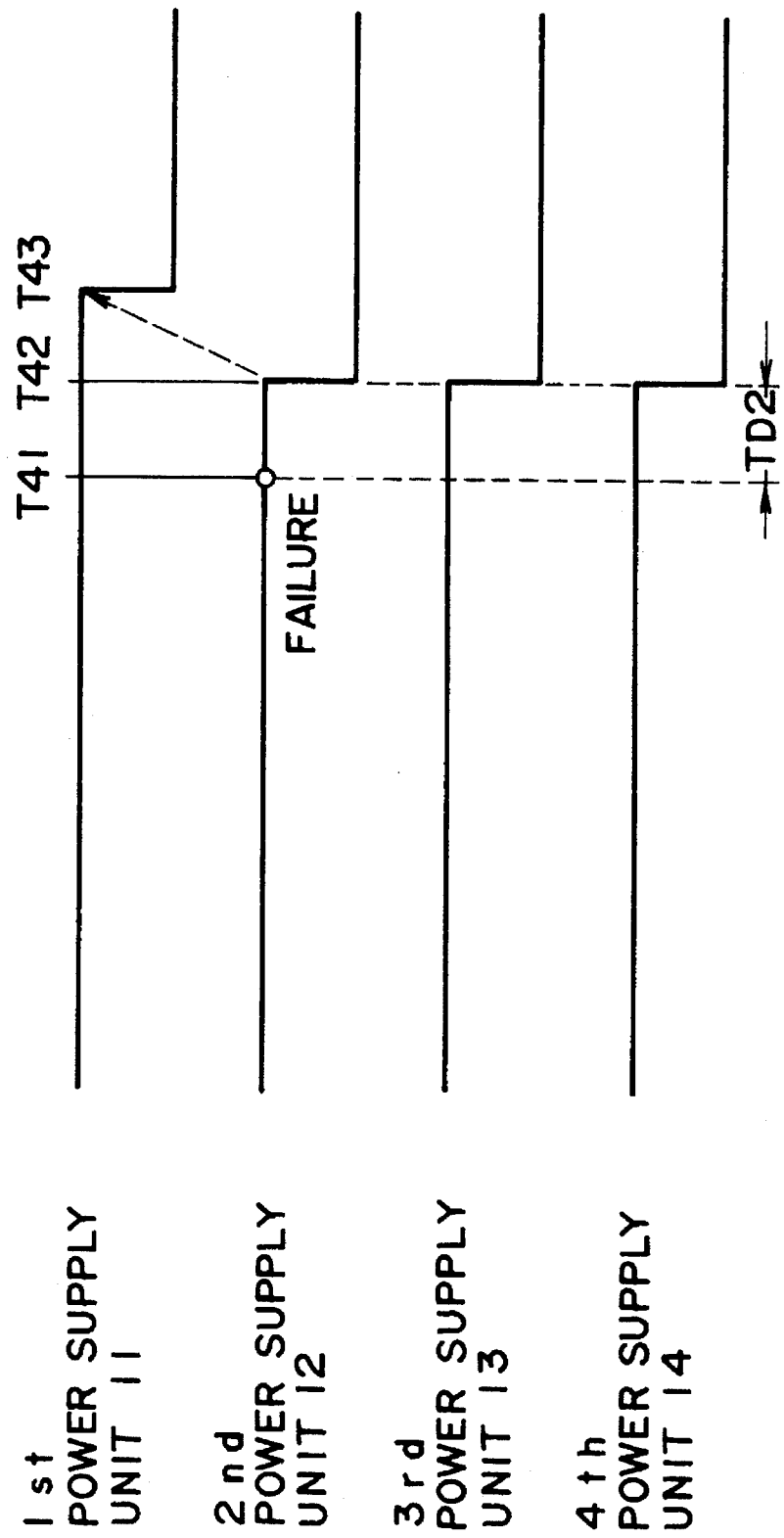
FIG. 4 is a time chart for use in describing power off operation when one of a plurality of power supply units has a failure.

Referring to FIG. 4 together with FIG. 2, let all the first through the fourth power supply units 11 to 14 be present at the one state. In this event, the first through the third normally-closed contacts r11 to r13 and the first through the third normally-open contacts r01 to r03 are present at the closed state. The normally-closed contact r10 is present at the open state.

Under the condition, if the failure occurs in the second power supply unit 12 at a first time instant T41 as shown in a second line of FIG. 4, the second power supply unit 12 delivers the second failure signal to the control unit 10 through the second failure signal line SF12. In this case, the second detection relay RL12 and the control relay RL10 are activated. As a result, the second normally-closed contact r12 is put into the open state while the normally-closed contact r10 is put into the closed state. When the normally-closed control r10 is put into the closed state, the sequence control unit 17 starts the power off sequence as mentioned before. However, prior to the power off sequence, the second through the fourth power supply units 12 to 14 are simultaneously put into the off state at a second time instant T42.

In detail, when the second normally-closed contact r12 is put into the open state, the second through the fourth power off signals indicating the off state are simultaneously supplied to the second through the fourth power supply units 12 to 14 through the second through the fourth control signal lines SC12 to SC14, respectively. Thus, the second through the fourth power supply units 12 to 14 are simultaneously put into the off state at the second time instant T42 regardless of the power off sequence. This is because the third and the fourth power supply units 13 and 14 have the third and the fourth output voltages which are not lower than the second output voltage. Next, the power off sequence becomes effective. In the example being illustrated, the sequence control unit 17 puts the first sequence relay RL10 into the inactive state at a third time instant T43. As a result, the first normally-closed contact r01 is put into the open state. Accordingly, the first power off signal indicating the off state is supplied to the first power supply unit 11 through the first control signal line SC11. Thus, the first power supply unit 11 is put into the off state in accordance with the power off sequence. This is because the first power supply unit 11 has the first output voltage lower than the second output voltage. Thus, the second through the fourth power supply units 12 to 14 are simultaneously put into the off state after a time duration TD2 from occurrence of the failure. The time duration TD2 is shorter than the time duration TD1 described in conjunction with FIG. 1. This means that it is possible to protect the logic circuits connected to the second power supply unit 12 from the damage caused by the second power supply unit 12 having the failure.

If the third power supply unit 13 produces the third failure signal, power off operation is similar to that described above.

When the fourth power supply unit 14 produces the fourth failure signal, only the fourth power supply unit 14 is, at first, put into the off state prior to the power off sequence because the third control relay RL13 is put into the active state. This is because the fourth power supply unit 14 generates the highest output voltage. Subsequently, the first through the third power supply units 11 to 13 are sequentially put into the off state, in accordance with the power off sequence, in voltage decreasing order of the first through the third output voltages.

If the first power supply unit 11 produces the first failure signal, all the first through the fourth power supply units 11 to 14 are simultaneously put into the off state regardless of the power off sequence because the first normally-closed contact r11 is put into the open state.

Although the failure detection control circuit 16 is implemented by relay circuits, the failure detection control circuit 16 may be implemented by a central processing unit (CPU) carrying out a signal processing operation in accordance with a predetermined program.

While this invention has thus far been described in conjunction with a preferred embodiment thereof, it will readily be possible for those skilled in the art to put this invention into practice in various other manners.

What is claimed is:

1. A power supply control system comprising:
   a plurality of power supply units generating output voltages and producing a plurality of failure signals;
   indicating means for selectively indicating one of a power on sequence and a power off sequence of said plurality of power supply units;

sequence control means for carrying out said power on sequence when said indicating means indicates said power on sequence and carrying out said power off sequence when said indicating means indicates said power off sequence, said power on sequence being for sequentially putting said plurality of power supply units into an on state in voltage increasing order of the values of said output voltages, said power off sequence being for sequentially putting said plurality of power supply units into an off state in voltage decreasing order of the values of said output voltages;

failure power off sequence means responsive to one of said plurality of failure signals including
   first means for putting one power supply unit of said plurality of power supply units that produces the one of said failure signals into the off state,
   second means for putting the power supply units having output voltages which are higher than or equal to that of said one power supply unit into the off state simultaneously with said one power supply unit, and
   third means for subsequently putting the power supply unit having the output voltages which are lower than that of said one power supply unit into the off state in accordance with said power off sequence.

2. A power supply control system as claimed in claim 1, wherein said failure power off sequence means comprises:
   signal supply means coupled to said sequence control means for supplying a plurality of power on signals indicative of said on state to said plurality of power supply units, respectively, in accordance with said power on sequence when said indicating means indicates said power on sequence and supplying a plurality of power off signals indicative of said off state to said plurality of power supply units, respectively, in accordance with aid power off sequence when said indicating means indicates said power off sequence.

3. A power supply control system as claimed in claim 2, wherein said failure power off sequence means further comprises:
   signal receiving means connected to said plurality of power supply units for receiving said plurality of failure signals;
   said signal supply means being coupled to said signal receiving means and supplying said plurality of power off signals to said plurality of power supply units, respectively, when said signal receiving means receives the one of said plurality of failure signals.

4. A power control system as claimed in claim 1, wherein said one power supply units is a power supply unit other than a power supply unit having a highest output voltage.

5. A power supply control system comprising:
   a plurality of power supply units generating output voltages and producing a plurality of failure signals;
   indicating means for selectively indicating one of a power on sequence and a power off sequence of said plurality of power supply units;
   sequence control means for carrying out one of said power on sequence and said power off sequence according to said indicating means, said power on sequence being for putting said plurality of power supply units into an on state, said power off sequence being for putting said plurality of power supply units into an off state; and
   failure power off sequence means responsive to said plurality of failure signals for executing a failure power off sequence different from said power off sequence, said failure power off sequence including (i) putting failed power supply units of said plurality of power supply units that produce the failure signals into the off state and, simultaneously, putting the power supply units having output voltages which are higher than or equal to that of said failed power supply units into the off state and (ii) subsequently putting the power supply unit having the output voltages which are lower than that of said failed power supply units into the off state.

6. A power control system as claimed in claim 5, wherein said failed power supply units include power supply units other than a power supply unit having a highest output voltage.

* * * * *